(12) United States Patent
Voss et al.

(10) Patent No.: US 11,775,134 B2
(45) Date of Patent: Oct. 3, 2023

(54) INTERFACE TO DISPLAY ANIMATED ICON

(71) Applicant: Snap Inc., Santa Monica, CA (US)

(72) Inventors: Jeremy Voss, Los Angeles, CA (US); Jesse Chand, Los Angeles, CA (US); Dylan Shane Eirinberg, Venice, CA (US); William Wu, Marina del Rey, CA (US); Chiayi Lin, Los Angeles, CA (US); Anna Liberman, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/248,887

(22) Filed: Feb. 11, 2021

(65) Prior Publication Data

US 2021/0165559 A1     Jun. 3, 2021

Related U.S. Application Data

(63) Continuation of application No. 16/707,688, filed on Dec. 9, 2019, now Pat. No. 10,942,624, which is a continuation of application No. 15/810,965, filed on Nov. 13, 2017, now Pat. No. 10,599,289.

(51) Int. Cl.
*G06F 3/0481*     (2022.01)
*G06F 3/0488*     (2022.01)
*G06T 13/80*      (2011.01)
*G06F 3/04817*    (2022.01)

(52) U.S. Cl.
CPC ........ *G06F 3/04817* (2013.01); *G06F 3/0488* (2013.01); *G06T 13/80* (2013.01)

(58) Field of Classification Search
CPC .... G06F 3/04817; G06F 3/0488; G06T 13/80
See application file for complete search history.

(56) References Cited

U.S. PATENT DOCUMENTS

| 5,754,939 A | 5/1998 | Herz et al. |
| 6,038,295 A | 3/2000 | Mattes |
| 6,158,044 A | 12/2000 | Tibbetts |
| 6,167,362 A * | 12/2000 | Brown ................ G16H 20/13 703/11 |
| 6,167,435 A | 12/2000 | Druckenmiller et al. |
| 6,205,432 B1 | 3/2001 | Gabbard et al. |

(Continued)

FOREIGN PATENT DOCUMENTS

| CA | 2887596 A1 | 7/2015 |
| WO | WO-2012000107 A1 | 1/2012 |

(Continued)

OTHER PUBLICATIONS

"U.S. Appl. No. 15/810,965, Advisory Action dated Jun. 25, 2019", 4 pgs.

(Continued)

*Primary Examiner* — Tadesse Hailu
(74) *Attorney, Agent, or Firm* — SCHWEGMAN LUNDBERG & WOESSNER, P.A.

(57) ABSTRACT

Embodiments of the present disclosure relate generally to mobile computing technology and, more particularly, but not by way of limitation, to systems for generating and presenting a graphical user interface (GUI) that includes a presentation of an animated icon (e.g., a digital pet) on a display of a client device.

20 Claims, 14 Drawing Sheets

(56) References Cited

U.S. PATENT DOCUMENTS

| | | | |
|---|---|---|---|
| 6,273,825 B1 * | 8/2001 | Schwarzler | F16D 3/227 464/139 |
| 6,292,198 B1 * | 9/2001 | Matsuda | G06N 3/006 345/473 |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,233,988 B2 * | 6/2007 | Minakuchi | H04W 8/005 709/213 |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,434,168 B2 * | 10/2008 | Hachiya | G06F 3/04817 715/757 |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,190,119 B2 * | 5/2012 | Jabara | G06Q 10/10 455/414.2 |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,628,392 B1 | 1/2014 | Kong | |
| 8,634,848 B1 * | 1/2014 | Bozarth | G01S 5/0284 455/456.1 |
| 8,718,333 B2 | 5/2014 | Wolf et al. | |
| 8,724,622 B2 | 5/2014 | Rojas | |
| 8,745,132 B2 | 6/2014 | Obradovich | |
| 8,854,356 B2 * | 10/2014 | Oyagi | A63F 13/655 345/419 |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,183,541 B2 * | 11/2015 | Iwai | G06Q 10/10 |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,626,070 B2 * | 4/2017 | Cowles | H04L 63/0861 |
| 9,628,950 B1 | 4/2017 | Noeth et al. | |
| 9,632,664 B2 * | 4/2017 | Foss | G06F 3/04817 |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,936,340 B2 * | 4/2018 | Meredith | G01S 5/0072 |
| 9,961,520 B2 | 5/2018 | Brooks et al. | |
| 10,599,289 B1 | 3/2020 | Voss et al. | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0080987 A1 | 5/2003 | Rosenberg | |
| 2003/0080989 A1 * | 5/2003 | Matsuda | G06F 3/0481 715/706 |
| 2003/0126215 A1 | 7/2003 | Udell | |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0111795 A1 | 5/2007 | Choi et al. | |
| 2007/0214216 A1 | 9/2007 | Carrer et al. | |
| 2007/0233801 A1 | 10/2007 | Eren et al. | |
| 2008/0039124 A1 | 2/2008 | Linder et al. | |
| 2008/0055269 A1 | 3/2008 | Lemay et al. | |
| 2008/0113793 A1 | 5/2008 | Miyamoto et al. | |
| 2008/0120409 A1 | 5/2008 | Sun et al. | |
| 2008/0207176 A1 | 8/2008 | Brackbill et al. | |
| 2008/0215995 A1 | 9/2008 | Wolf | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0070286 A1 * | 3/2009 | Liss | G06F 3/04842 |
| 2009/0132453 A1 | 5/2009 | Hangartner et al. | |
| 2009/0183071 A1 | 7/2009 | Smith et al. | |
| 2009/0307609 A1 * | 12/2009 | Ganz | G06Q 90/00 715/753 |
| 2010/0082427 A1 | 4/2010 | Burgener et al. | |
| 2010/0131880 A1 | 5/2010 | Lee et al. | |
| 2010/0146419 A1 | 6/2010 | Castelli et al. | |
| 2010/0185665 A1 | 7/2010 | Horn et al. | |
| 2010/0306669 A1 | 12/2010 | Della Pasqua | |
| 2011/0070935 A1 | 3/2011 | Beggs | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0225538 A1 * | 9/2011 | Oyagi | H04N 13/31 715/781 |
| 2011/0286586 A1 | 11/2011 | Saylor et al. | |
| 2011/0320373 A1 | 12/2011 | Lee et al. | |
| 2012/0028659 A1 | 2/2012 | Whitney et al. | |
| 2012/0154377 A1 * | 6/2012 | Sato | G06T 19/00 345/419 |
| 2012/0184248 A1 | 7/2012 | Speede | |

(56) References Cited

U.S. PATENT DOCUMENTS

| | | | |
|---|---|---|---|
| 2012/0209921 A1 | 8/2012 | Adafin et al. | |
| 2012/0209924 A1 | 8/2012 | Evans et al. | |
| 2012/0254325 A1 | 10/2012 | Majeti et al. | |
| 2012/0278692 A1 | 11/2012 | Shi | |
| 2012/0304080 A1 | 11/2012 | Wormald et al. | |
| 2013/0038490 A1 | 2/2013 | Garcia | |
| 2013/0071093 A1 | 3/2013 | Hanks et al. | |
| 2013/0102379 A1* | 4/2013 | Sargent | A63F 13/63 463/22 |
| 2013/0103760 A1 | 4/2013 | Golding et al. | |
| 2013/0137515 A1 | 5/2013 | Kusuda et al. | |
| 2013/0194301 A1 | 8/2013 | Robbins et al. | |
| 2013/0290443 A1 | 10/2013 | Collins et al. | |
| 2013/0314578 A1 | 11/2013 | Imaizumi et al. | |
| 2014/0007154 A1* | 1/2014 | Seibold | H04N 21/454 725/25 |
| 2014/0032682 A1 | 1/2014 | Prado et al. | |
| 2014/0055492 A1* | 2/2014 | Cohen | A63F 13/12 345/633 |
| 2014/0122787 A1 | 5/2014 | Shalvi et al. | |
| 2014/0125678 A1 | 5/2014 | Wang et al. | |
| 2014/0136978 A1* | 5/2014 | Verma | H04L 65/1083 715/716 |
| 2014/0178029 A1* | 6/2014 | Raheman | H04N 21/41415 386/224 |
| 2014/0201527 A1 | 7/2014 | Krivorot | |
| 2014/0206444 A1 | 7/2014 | Lin et al. | |
| 2014/0240216 A1* | 8/2014 | Bukurak | G06F 3/01 345/156 |
| 2014/0273717 A1 | 9/2014 | Judkins et al. | |
| 2014/0282096 A1 | 9/2014 | Rubinstein et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0062052 A1* | 3/2015 | Bernstein | G06F 3/0416 345/173 |
| 2015/0089660 A1* | 3/2015 | Song | G06Q 20/384 705/15 |
| 2015/0135077 A1 | 5/2015 | Fuzell-casey | |
| 2015/0193982 A1* | 7/2015 | Mihelich | H04L 67/131 345/633 |
| 2015/0195397 A1 | 7/2015 | Rice | |
| 2015/0199082 A1 | 7/2015 | Scholler et al. | |
| 2015/0227602 A1 | 8/2015 | Ramu et al. | |
| 2015/0310671 A1 | 10/2015 | Kim et al. | |
| 2016/0067599 A1 | 3/2016 | Janis et al. | |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0236096 A1* | 8/2016 | Trzecieski | A63F 13/537 |
| 2016/0259497 A1* | 9/2016 | Foss | G06F 3/0483 |
| 2016/0261675 A1* | 9/2016 | Block | G06F 3/0481 |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0161382 A1 | 6/2017 | Ouimet et al. | |
| 2017/0171035 A1* | 6/2017 | Lu | G06F 3/04817 |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0374003 A1 | 12/2017 | Allen et al. | |
| 2017/0374508 A1 | 12/2017 | Davis et al. | |
| 2018/0188905 A1* | 7/2018 | Tran | G06F 3/0488 |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 15/810,965, Final Office Action dated May 17, 2019", 13 pgs.

"U.S. Appl. No. 15/810,965, Non Final Office Action dated Feb. 27, 2019", 11 pgs.

"U.S. Appl. No. 15/810,965, Notice of Allowance dated Nov. 12, 2019", 7 pgs.

"U.S. Appl. No. 15/810,965, Response filed May 22, 2019 to Final Office Action dated May 17, 2019", 12 pgs.

"U.S. Appl. No. 15/810,965, Response filed Mar. 6, 2019 Non Final Office Action dated Feb. 17, 2019", 12 pgs.

"U.S. Appl. No. 16/707,688, Notice of Allowance dated Nov. 4, 2020", 8 pgs.

Castelluccia, Claude, et al., "EphPub: Toward robust Ephemeral Publishing", 19TH IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptit>, (Dec. 13, 2005), 2 pgs.

* cited by examiner

```
                    ┌─────────────────────────────────────────────────────┐
                    │ CAUSE DISPLAY OF A GRAPHICAL USER INTERFACE (GUI)   │
                    │ THAT INCLUDES A PRESENTATION OF AN ANIMATED ICON    │
                    │ AT A LOCATION WITHIN THE GUI                        │
                    │                        802                          │
                    └─────────────────────────────────────────────────────┘
                                            │
                                            ▼
                    ┌─────────────────────────────────────────────────────┐
                    │       RECEIVE A USER INPUT THROUGH THE GUI          │
                    │                        804                          │
                    └─────────────────────────────────────────────────────┘
                                            │
                                            ▼
                    ┌─────────────────────────────────────────────────────┐
                    │ ADJUST A DISPLAY STATE MODEL ASSOCIATED WITH THE    │
                    │ ANIMATED ICON BASED ON THE USER INPUT               │
                    │                        806                          │
                    └─────────────────────────────────────────────────────┘
                                            │
                                            ▼
                    ┌─────────────────────────────────────────────────────┐
                    │ DETERMINE A STATE OF THE ANIMATED ICON BASED ON THE │
                    │ DISPLAY STATE MODEL                                 │
                    │                        808                          │
                    └─────────────────────────────────────────────────────┘
                                            │
                                            ▼
                    ┌─────────────────────────────────────────────────────┐
                    │ ALTER THE PRESENTATION OF THE ANIMATED ICON BASED   │
                    │ ON THE STATE                                        │
                    │                        810                          │
                    └─────────────────────────────────────────────────────┘
```

*FIG. 8*

```
┌─────────────────────────────────────────────────────────────┐
│ ACTIVATE A USER INPUT INTERFACE THAT INCLUDES A DISPLAY OF A SET │
│                    OF USER INPUT TYPES                      │
│                            902                              │
└─────────────────────────────────────────────────────────────┘
                              │
                              ▼
┌─────────────────────────────────────────────────────────────┐
│ RECEIVE A SELECTION OF A USER INPUT TYPE FROM AMONG THE SET OF │
│                      USER INPUT TYPES                       │
│                            904                              │
└─────────────────────────────────────────────────────────────┘
                              │
                              ▼
┌─────────────────────────────────────────────────────────────┐
│   ADJUST THE DISPLAY STATE MODEL BASED ON THE USER INPUT TYPE │
│                            906                              │
└─────────────────────────────────────────────────────────────┘
```

FIG. 9

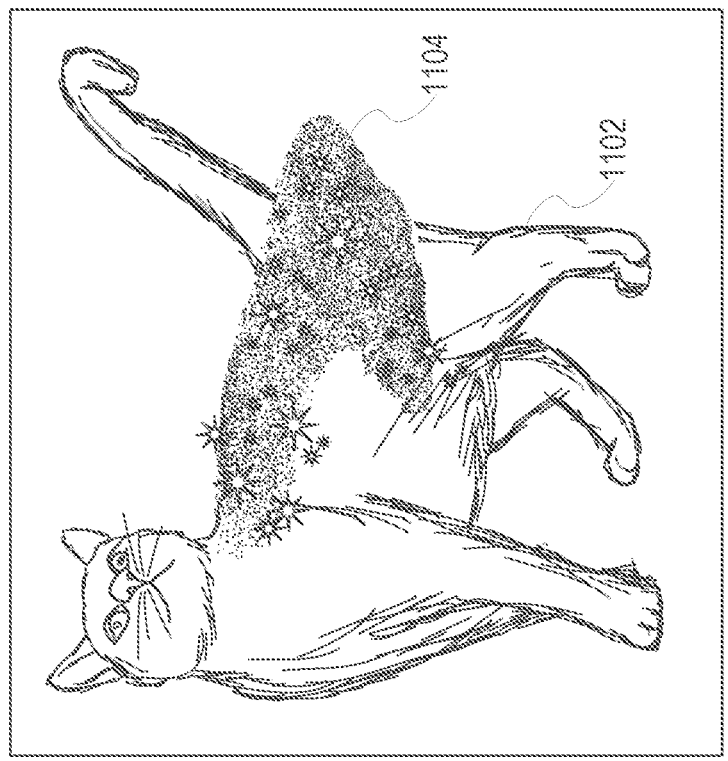
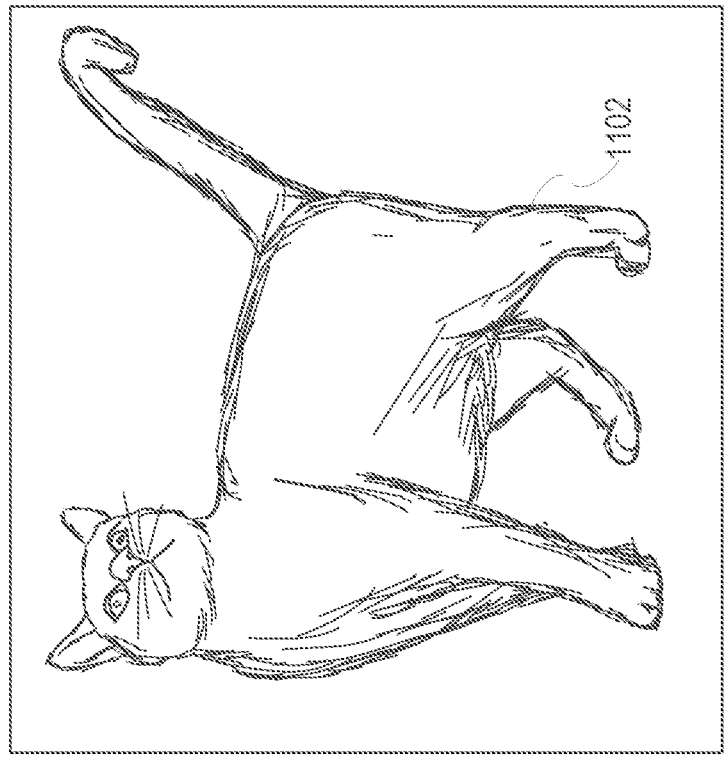
FIG. 11

INTERFACE TO DISPLAY ANIMATED ICON

CLAIM OF PRIORITY

This application is a continuation of and claims the benefit of priority of U.S. patent application Ser. No. 16/707,688, filed on Dec. 9, 2019, which is a continuation of and claims the benefit of priority of U.S. patent application Ser. No. 15/810,965, filed on Nov. 13, 2017, each of which are hereby incorporated by reference herein in their entireties.

TECHNICAL FIELD

Embodiments of the present disclosure relate generally to mobile computing technology and, more particularly, but not by way of limitation, to systems for generating and presenting a graphical user interface that includes an animated icon at a client device.

BACKGROUND

Artificial human companions, such as digital pets, include hardware and software designed to simulate and provide a form of entertainment and companionship to a person or persons. Digital pets are distinct in that they have no concrete physical form other than the hardware that they run on. Interactions with the digital pets may or may not be goal oriented.

Augmented reality (AR), is a live direct or indirect view of a physical, real-world environment whose elements are augmented by computer-generated sensory inputs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 is a flowchart illustrating a method for displaying and altering a presentation of an animated icon at one or more client, according to certain example embodiments.

FIG. 9 is a flowchart illustrating a method for adjusting a display state model based on a user input, according to certain example embodiments.

FIG. 11 is a depiction of an animated icon, according to certain example embodiments.

DETAILED DESCRIPTION

Figure 1:
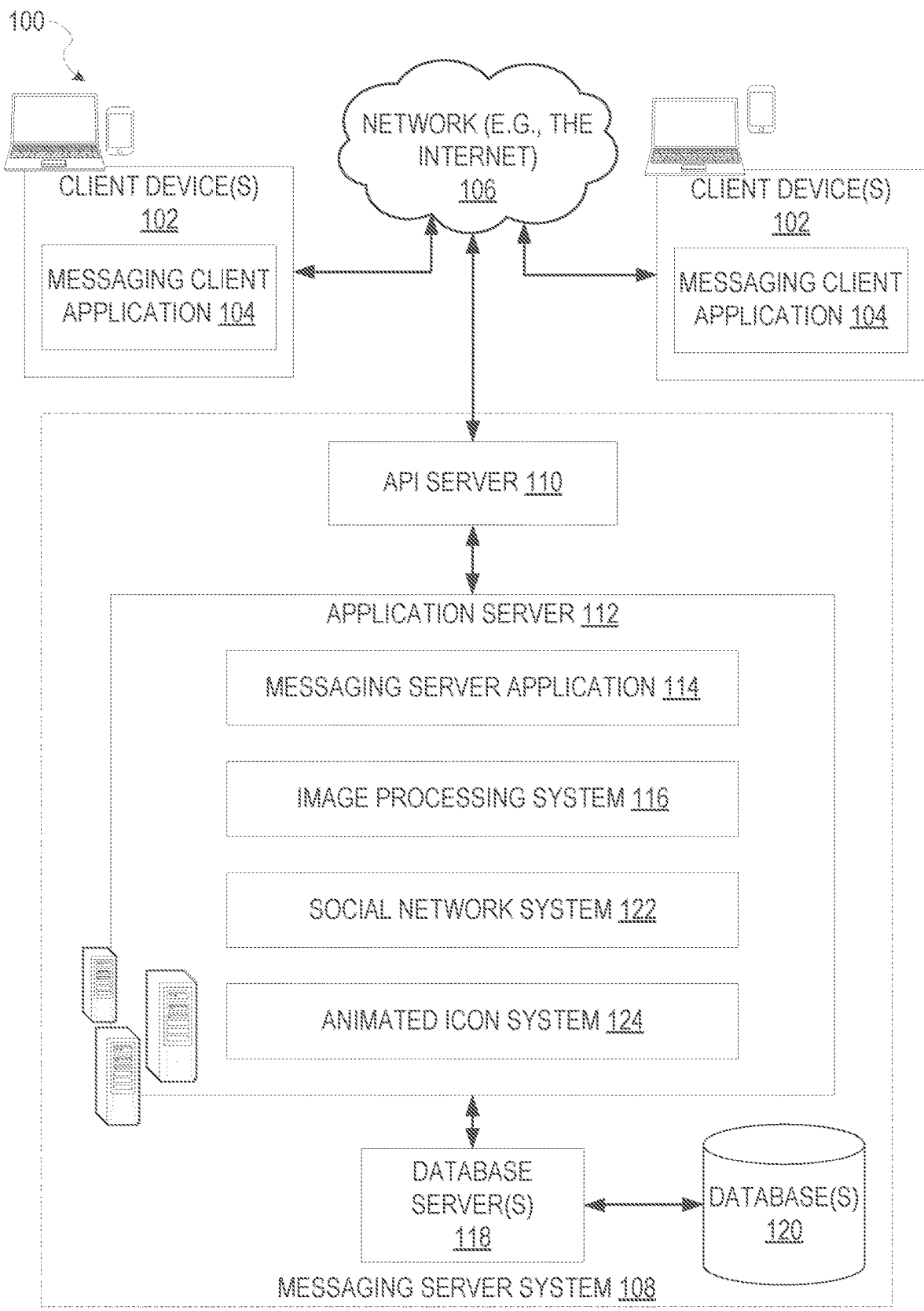
FIG. 1 is a block diagram showing an example messaging system for exchanging data (e.g., messages and associated content) over a network in accordance with some embodiments, wherein the messaging system includes an animated icon system.

Embodiments of the present disclosure relate generally to mobile computing technology and, more particularly, but not by way of limitation, to systems for generating and presenting a graphical user interface (GUI) that includes a presentation of an animated icon (e.g., a digital pet) on a display of a client device.

For example, the animated icon may include a virtual pet (e.g., a dog, a cat, a fish, etc.). A user may interact with the virtual pet at their respective device, causing the presentation of the pet to change. For example, a user may provide inputs to interact with the pet and cause the pet to change "moods" or "emotional states." In response, the pet may respond to the user based on a current mood or emotional state.

In some embodiments, particular interface details are presented to enable multiple users to interact with the same virtual pet in an augmented reality environment. In some embodiments, the animated icon may be associated with one or more user accounts, such that the animated icon may be limited to display at the client devices of the one or more associated user accounts.

In some embodiments, the GUI may include an Augmented Reality (AR) interface, depicting a real-world space captured by a camera of the client device, and wherein the animated icon is rendered at a location within the real-world space depicted within the AR interface. In further embodiments, the GUI may simply comprise a message log that includes a presentation of one or more messages received at the client device.

In some example embodiments, the animated icon system may receive user inputs to interact with the animated icon through the GUI. For example, the user inputs may include inputs swiping, tapping, or otherwise touching the presentation of the animated icon within the GUI. In response to receiving the user input, the animated icon system may access a display state model to determine a subsequent state of the animated icon based on the user input. The animated icon system may thereby alter the presentation of the animated icon based on the determined state.

The display state model may include a two-axis space, wherein the X axis and the Y axis represent distinct attributes that may combine to form a state of the animated icon. For example, a position (e.g., X and Y coordinates) of a state indicator within the two-axis space may represent a state of the animated icon. User inputs received through the GUI may move the state indicator by incremental points along the X or Y axis.

In some example embodiments, the two-axis space may be further segmented into sub-spaces which cover ranges of coordinates within the overall two-axis space. For example, the two-axis space may be segmented into 8 distinct sub-spaces, wherein each sub-space represents a distinct state of the animated icon. As the state indicator moves along the X and Y axis of the display state model, a state of the animated icon may be determined based on a sub-space in which the state indicator lands.

The user input received through the GUI may have associated attributes, such as a duration, a speed, and a user input type. In some example embodiments, the animated icon system may determine an X-value and a Y-value to increment the state indicator based on various attributes of the user input. For example, the user input may move the state indicator by a positive value on the X-axis and a negative value on the Y-axis.

In some example embodiments, the animated icon system may apply a threshold value before determining whether or not to move the state indicator. For example, the animated icon system may retrieve a threshold value based on a current state of the animated icon, and compare attributes of the user input to the threshold value (e.g., a minimum or a maximum). Upon determining that one or more attributes of the user input transcends the threshold value, the animated icon system may move the state indicator within the display state model.

The animated icon system alters the presentation of the animated icon within the GUI based on a determined state of the animated icon (i.e., based on the display state model). The altering of the presentation may include causing the animated icon to execute an animation, or may cause the animated icon to animate in a particular manner based on the determined state. In some embodiments, the state of the animated icon may determine how the user may interact with the animated icon and how the animated icon may respond to the user's inputs.

Consider an illustrative example from the perspective of two users of the animated icon system, User-A and User-B. The pair of users may opt to generate an animated icon via one or more user inputs, or in some example embodiments, the animated icon system may automatically generate and present an animated icon to User-A and User-B in response to an analysis of communication patterns of User-A and User-B, or based on a comparison of user attributes of User-A and User-B. For example, the animated icon system may determine that User-A and User-B communicate on a daily basis, or that User-A and User-B are in a relationship with one another (based on user profile information of the users). In response, the animated icon system generates and display an animated icon at client devices associated with User-A and User-B.

The animated icon may be displayed within communication channels between User-A and User-B. For example, upon receiving a message from User-B at a device of User-A, the animated icon may appear within a GUI at the device of User-A. In further embodiments, the animated icon may appear at devices of User-A and User-B upon detecting User-A and User-B in proximity with one another (e.g., within 50 feet of one another).

User-A and User-B may interact with the animated icon at their respective devices. In some embodiments, if User-A and User-B are not in proximity with one another, the animated icon may only be displayed at one device at a given time. User-A and User-B may interact with the animated icon, to cause the animated icon to change from one state to another. In some embodiments, the users may alter the presentation of the animated icon by changing a color, style, or adding accessories to the animated icon. The changes to the animated icon may be visible at both devices.

For example, the animated icon may include a virtual pet (e.g., a dog, a cat, a fish, etc.). User-A may interact with the virtual pet at their respective device, causing the pet to change states, wherein the states may be represented as a mood or emotional state of the virtual pet. Based on the interactions with the virtual pet, the virtual pet may transition from being depicted as "sleepy," to being depicted as "alert." At a later time, User-B may display the virtual pet at their respective device and find that the virtual pet is "alert," as a result of User-A's interactions. User-B may similarly interact with the virtual pet.

In accordance with some embodiments described herein, an animated icon system may be or include any instrumentality or aggregate of instrumentalities operable to compute, process, store, display, generate, communicate, or apply various forms of data for generating a GUI that includes a presentation of an interactive, animated icon at a client device.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an animated icon system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
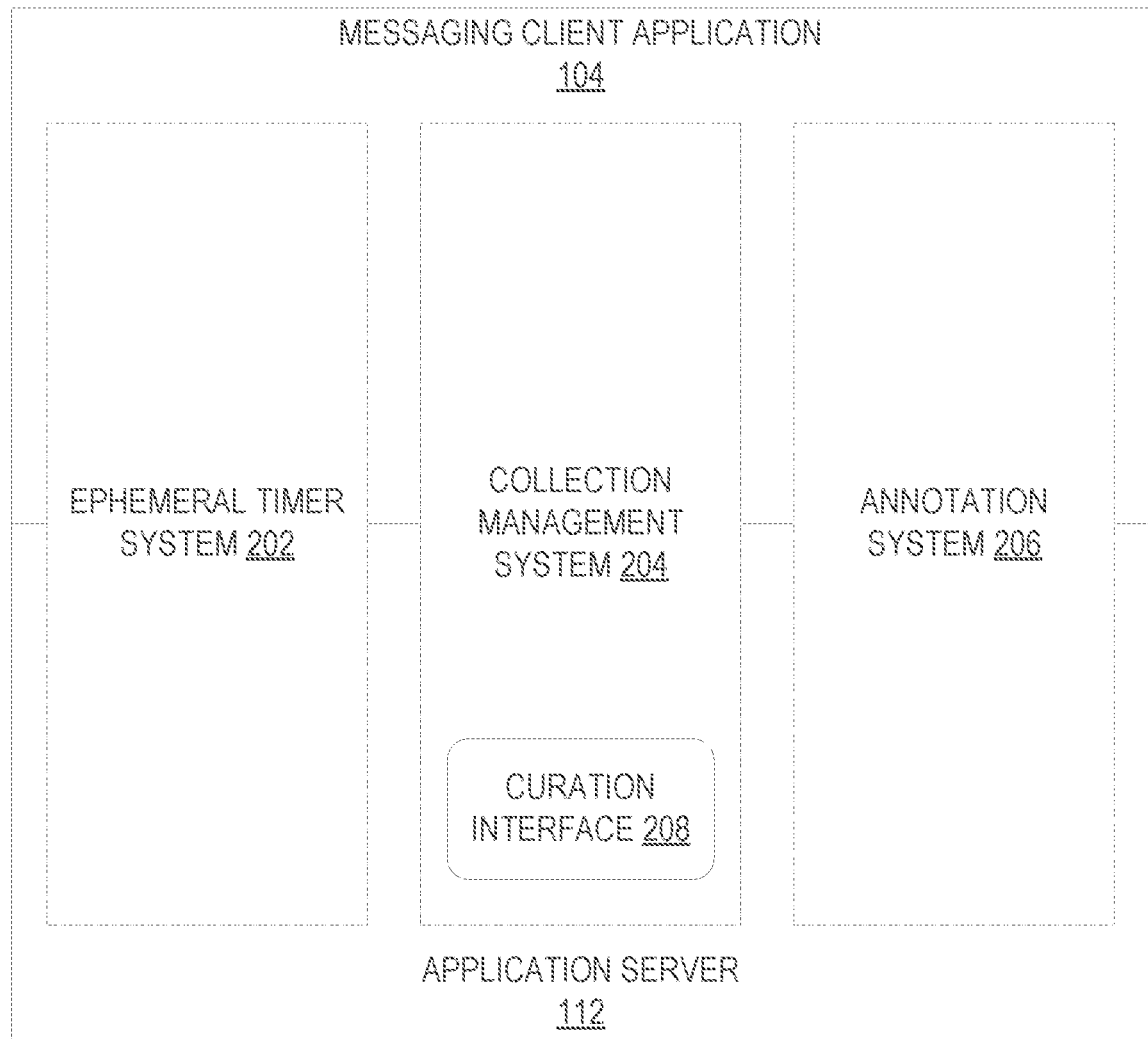
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
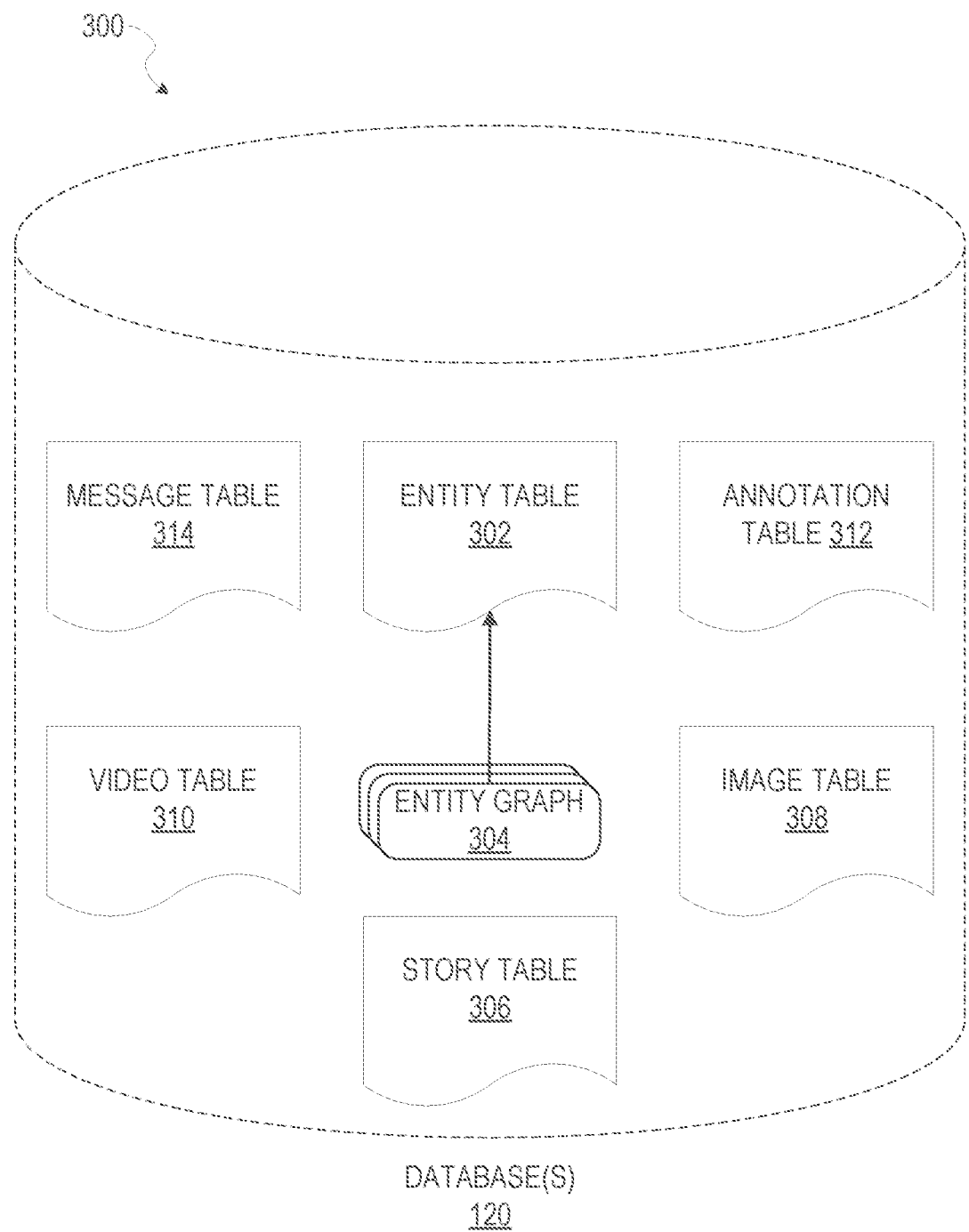
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
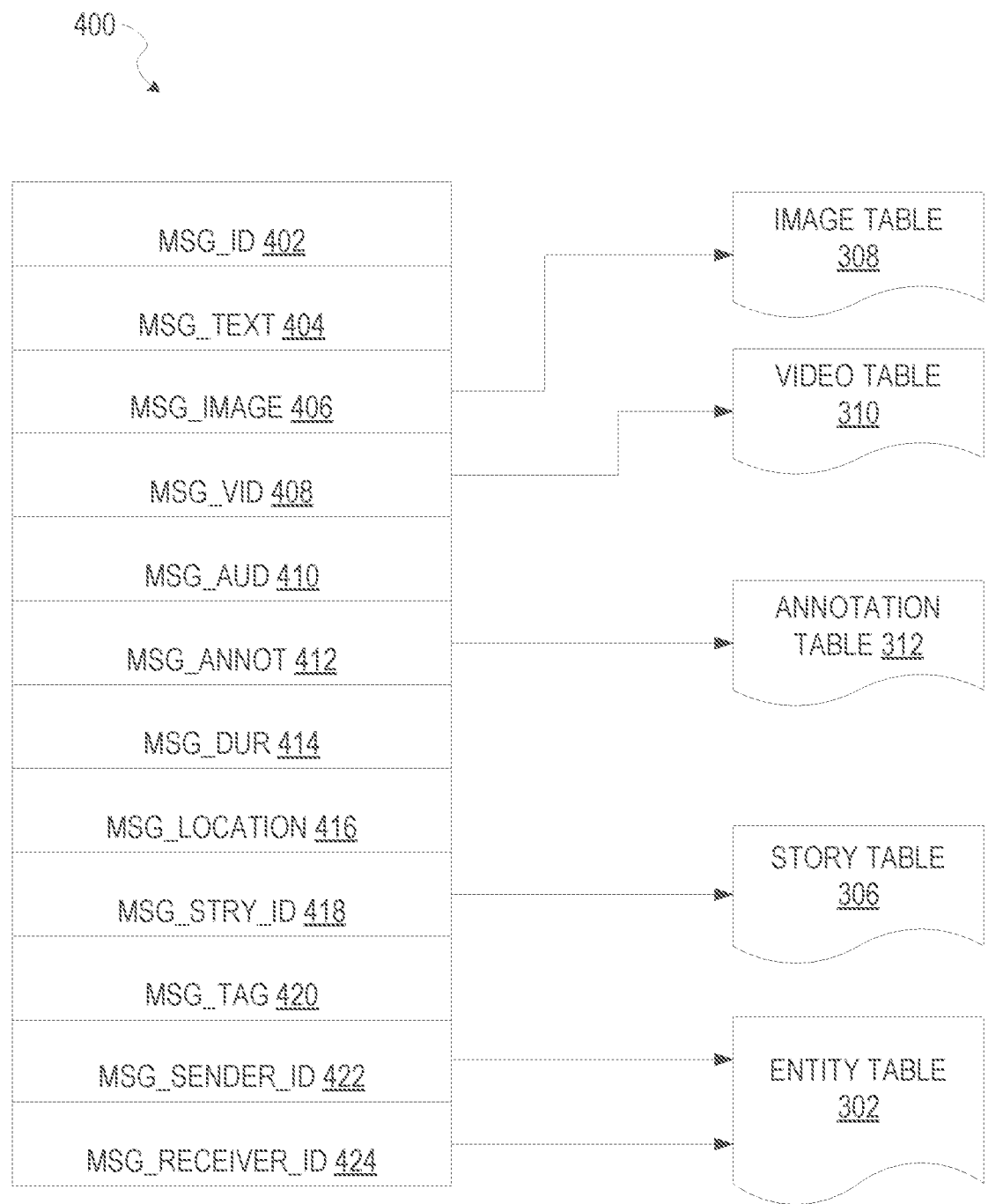
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
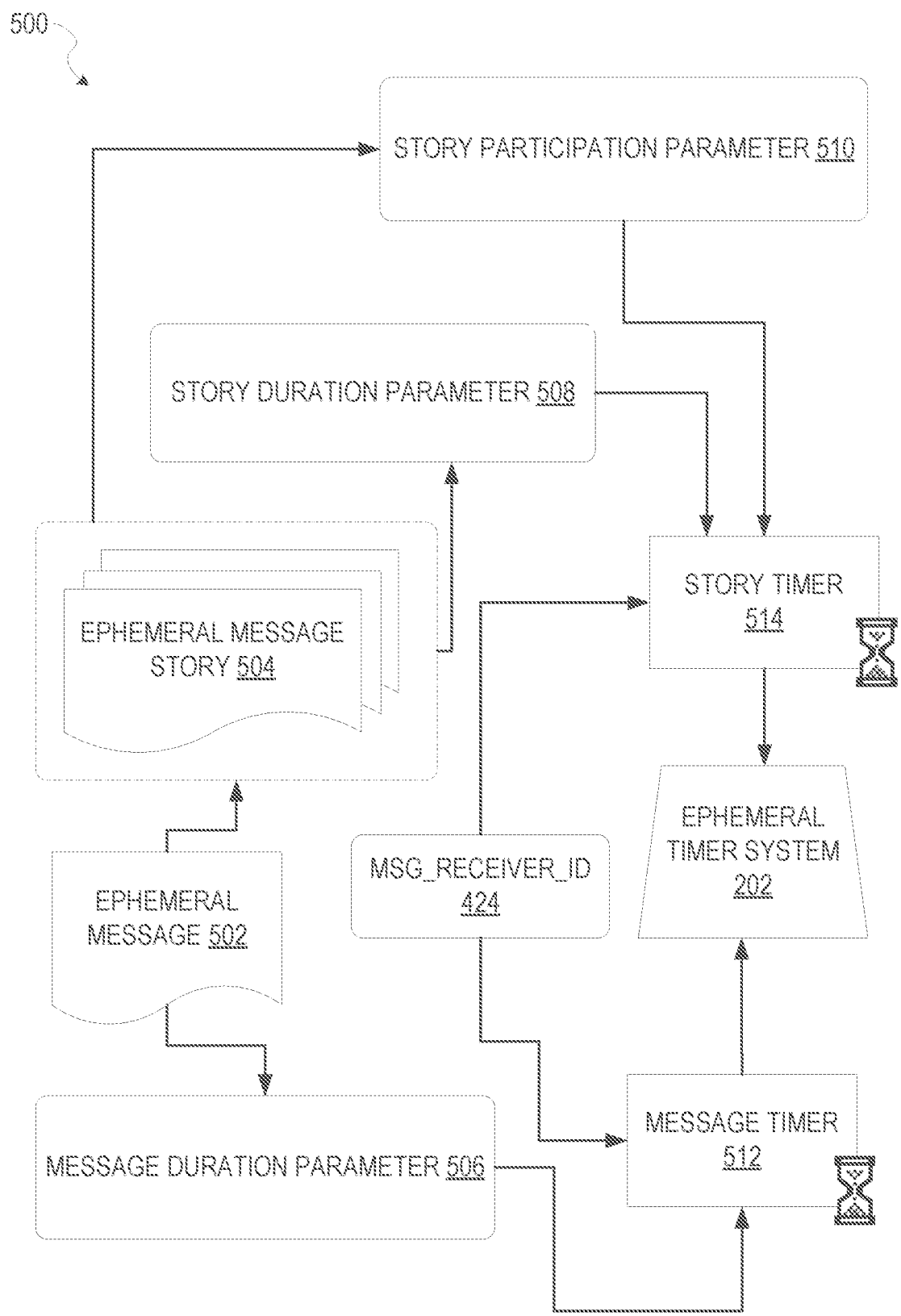
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
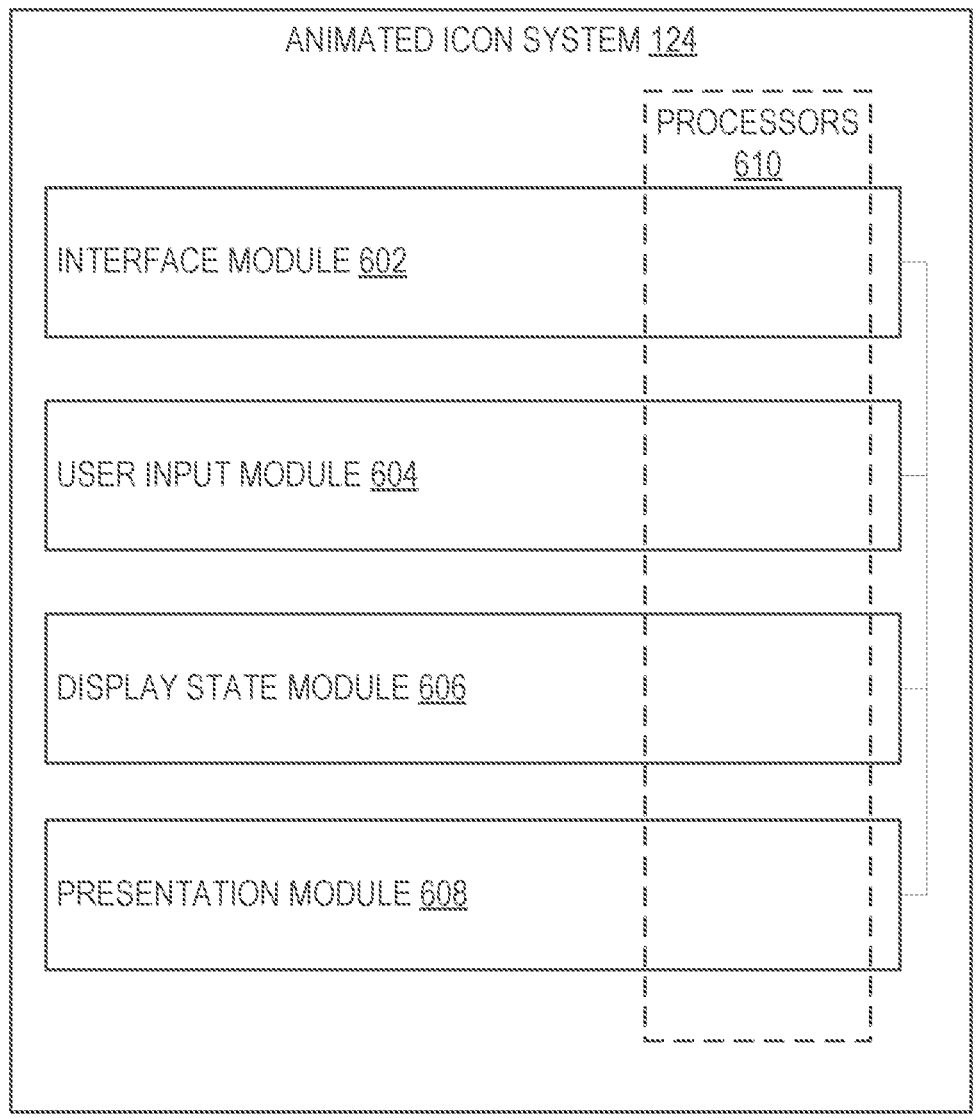
FIG. 6 is a block diagram illustrating various modules of an animated icon system, according to certain example embodiments.

FIG. 6 is a block diagram illustrating components of the animated icon system 124, that configure the animated icon system 124 to generate and cause display of an interactive, animated icon at one or more client devices, receive user inputs interacting with the animated icons, adjust a display state model associated with the animated icon, determine a state of the animated icon based on the display state model, and alter the presentation of the animated icon at the one or more client devices based on the state, according to some example embodiments. The animated icon system 124 is shown as including an interface module 602, a user input module 604, a display state module 606, and a presentation module 608, all configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the animated icon system 124 may physically include an arrangement of one or more of the processors 610 (e.g., a subset of or among the one or more processors of the machine) configured to perform the operations described herein for that module. As another example, any module of the animated icon system 124 may include software, hardware, or both, that configure an arrangement of one or more processors 610 (e.g., among the one or more processors of the machine) to perform the operations described herein for that module. Accordingly, different modules of the animated icon system 124 may include and configure different arrangements of such processors 610 or a single arrangement of such processors 610 at different points in time. Moreover, any two or more modules of the animated icon system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
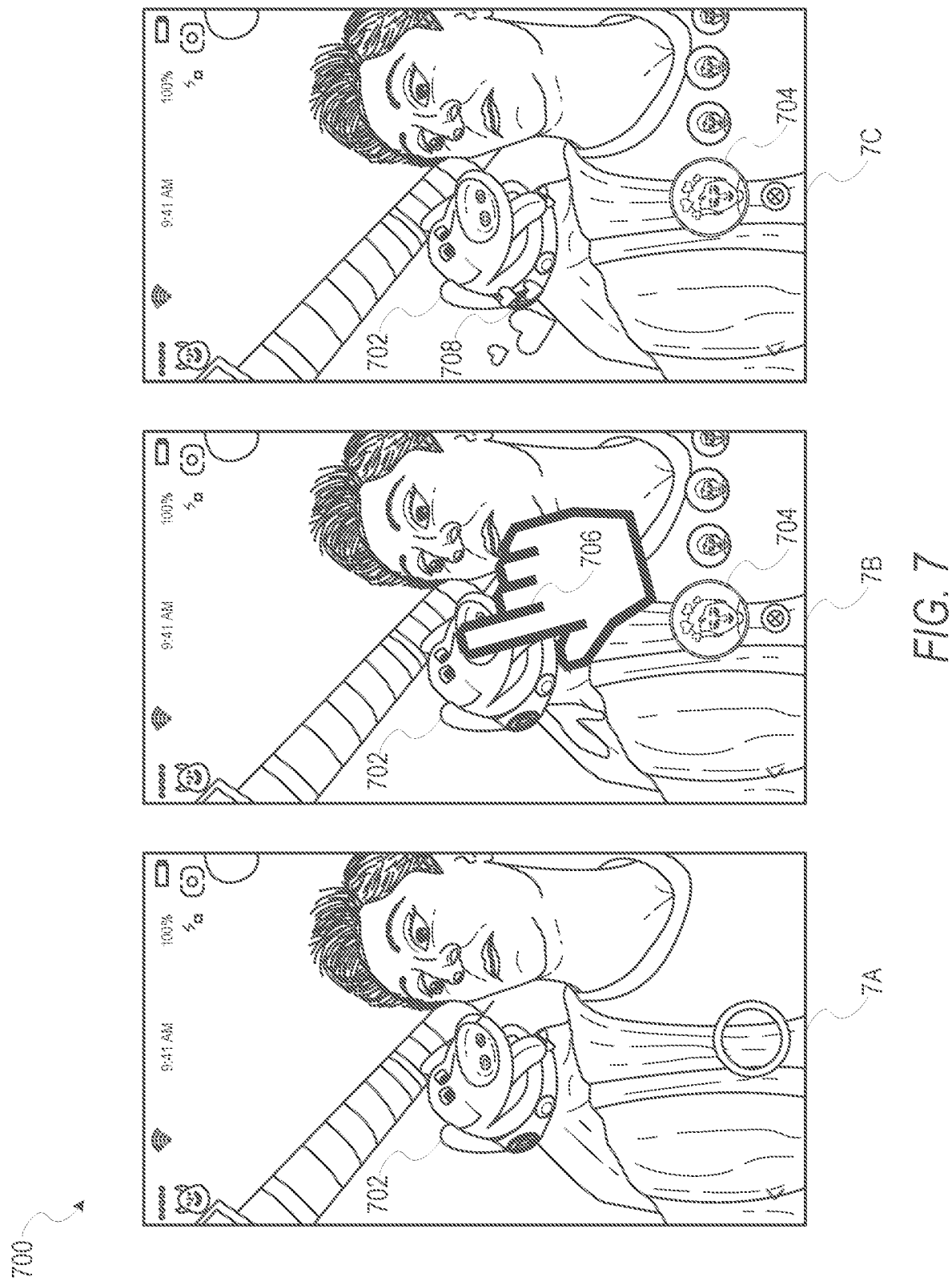
FIG. 7 includes depictions of various stages of a graphical user interface that includes a presentation of an interactive animated icon, according to certain example embodiments.

FIG. 7 includes depictions of stages of a GUI displayed at a client device 102 (stage 7A, stage 7B, and stage 7C), that includes a presentation of an animated icon 702, according to certain example embodiments.

At stage 7A, the interface module 602 may display a presentation of a real-world space based on image data captured by a camera of the client device 102. The presentation module 608 generates and causes display of the animated icon 702 at a location within the GUI. As seen in FIG. 7, the animated icon may include a digital/virtual pet, such as a dog. In some embodiments, a user may select the type of virtual pet from among a selection of virtual pets, while in further embodiments, the type of virtual pet may be determined based on user interaction data. For example, the virtual pet may initially be displayed as an egg which one or more users may interact with. Based on the interactions with the egg, the animated icon system 124 may determine a virtual pet type.

At stage 7B, the interface module 602 receives a user input at a location of the animated icon 702 within the GUI. For example, the client device 102 may be a touch enabled device. In some embodiments, the presentation module 608 may cause display of an indication of the user input, such as by a finger-tracking element 706.

In response to receiving the user input, the interface module 602 may expand a "petting mode carousel" 704 that includes a presentation of a set of user input types. The user may select a user input type from among the set of user input types. The type of user input may affect how the display state module is adjusted in order to determine a state of the animated icon.

At stage 7C, the presentation module 608 alters the presentation of the animated icon 702 based on the user input. For example, the presentation module may cause the animated icon 702 to appear "happy," or "loved," through the display of an indication of a state change 708.

FIG. 8 is a flowchart illustrating a method 800 for displaying and altering a presentation of an animated icon at one or more client devices (e.g., client devices 102), according to certain example embodiments. Operations of the method 800 may be performed by the modules described above with respect to FIG. 6. As shown in FIG. 8, the method 800 includes one or more operations 802, 804, 806, 808, and 810.

At operation 802, the interface module 602 causes the client device 102 to display a GUI that include a presentation of an animated icon at a location within the GUI. For example, in some embodiments the animated icon may include a digital/virtual pet presented within an augmented reality presentation of a real-world space proximate to the client device. In further embodiments, the animated icon may include a digital/virtual pet presented at a location within a chat or message feed that includes a series of communications between two or more users.

In further embodiments, the animated icon may be presented in one interface or another based on one or more inputs that define a context of a communication between the two or more users. For example, the interface module 602 may determine that two or more users have initiated a video chat communication session, that a camera of the client device 102 has been activated to capture a picture or video to be sent from one client device to another client device, or that two or more client device associated with the animated icon are proximate to one another (e.g., based on geolocation data).

For example, the interface module 602 may receive one or more inputs from a set of client devices associated with the animated icon (e.g., a first client device and a second client device), wherein the one or more inputs specify locations of the client devices. The one or more inputs may include check-in request data, or GPS data that specifies locations of each client device among the set of client devices. Based on the one or more inputs, the interface module 602 may determine that the set of client devices are within a predefined proximity of one another. In some example embodiments, users of the set of client devices associated with the animated icon may provide inputs that define the predefined distance. For example, the user may specify that the animated icon should appear in the GUI when the users are a distance from one another (e.g., within 500 meters of one another, checked in at the same location, in the same time-zone).

In further embodiments, the interface module 602 may cause display of the animated icon within GUIs of devices associated with the animated icon in response to detecting an initiation of a communication session between the devices. For example, the interface module 602 may receive inputs indicating that a video chat, a text message conversation, or an ephemeral message was sent/initiated between the set of client devices associated with the animated icon. In response to detecting the initiation of the communication session, the interface module 602 generates and causes display of the presentation of the animated icon at the respective GUIs of the associated client devices.

In some example embodiments, the presentation of the animated icon within the GUI may be based on attributes of the GUI itself. For example, the client device 102 may include multiple cameras, such as a front facing camera and a rear facing camera. The presentation of the animated icon may be based on which camera is being used by the user. For example, the presentation of the animated icon may be stylized based on which camera is activated, or a greater level of detail of the animated icon may be rendered based on which camera is activated.

At operation 804, the user input module 604 detects a user input at the client device 102. The user input may for example a tactile input into a touch screen of the client device 102, wherein the user input is received at the location within the GUI that includes the presentation of the animated icon. The user input may for example include tactile inputs from a user in the client device 102, swiping, tapping, flicking, or petting the presentation of the animated icon within the GUI.

In some example embodiments, in response to detecting the user input at the client device 102, the presentation module 608 may cause display of an indication of the user input at a location in the GUI where the user input was received. For example, the indication of the user input may include a finger-tracking visual effect that tracks the user input in real-time. For example, the visual effect may include a transparent finger icon that follows the user input as it is received, or a trail of glittering and sparkling elements (e.g., a comet tail). In some embodiments, the visual effect may be based on attributes of the user input itself. For example, the visual effect may vary (e.g., color, shape, duration on screen, size) based on whether the user input is tapping, swiping, pressing, flicking, or just touching and holding.

At operation 806, the display state module 606 adjusts a display state model associated with the animated icon based on the user input. The display state model may include a two-axis space where coordinates of a point located within the two-axis space define a state of the animated icon. The display state module 606 may adjust a position of the point located within the two-axis space based on the user inputs received through the GUI, wherein the user input may comprise one or more input attributes including, for example, an input duration, a user input type, and a user input style.

In some embodiments, the state of the animated icon may initially begin at the center of the two-axis space, and move based on user inputs and user interactions with the animated icon. For example, the state may reset to the center (or another position) within the two-axis space every time the animated icon is initially displayed at a client device 102, while in other example embodiments, the display state module 606 may save a final state of the animated icon in response to receiving an input from the user that closes or obstructs the GUI at the client device 102 (e.g., sleep mode, closes app, launches different app). In some embodiments, the display state model may be segmented into a set of sub-spaces, wherein each sub-space corresponds to a state of the animated icon. The state of the animated icon may therefore be determined based on which sub-space the point lands.

At operation 810, the presentation module 608 alters the presentation of the animated icon based on the state. The presentation module 608 may cause the animated icon to perform an animation, or to adjust or change a color, size, or feature of the animated icon based on the state.

FIG. 9 is a flowchart illustrating a method 900 for adjusting a display state model based on a user input, according to certain example embodiments. Operations of the method 900 may be performed by the modules described above with respect to FIG. 6. As shown in FIG. 9, the method 900 includes one or more operations 902, 904, and 906.

At operation 902, the interface module 602 activates and displays a presentation of a set of user input types (e.g., "petting mode carousel" 704 of FIG. 7). The user may select a user input type from among the set of user input types. The type of user input may affect how the display state module is adjusted in order to determine a state of the animated icon.

At operation 904, the interface module 602 receives a selection of a user input type from among the set of user input types displayed in the presentation. Each user input type may cause the display state module 606 to move or adjust a location of a point within the display state model by an amount and in a direction, based on attributes of the user input that include the user input type.

At operation 906, the display state module 606 increments the point within the display state model based on the user input. For example, the display state module 606 may move the point up by a value on the Y-axis and to the left by another value on the X-axis, wherein the direction and the value are based on attributes of the user input.

Figure 10:
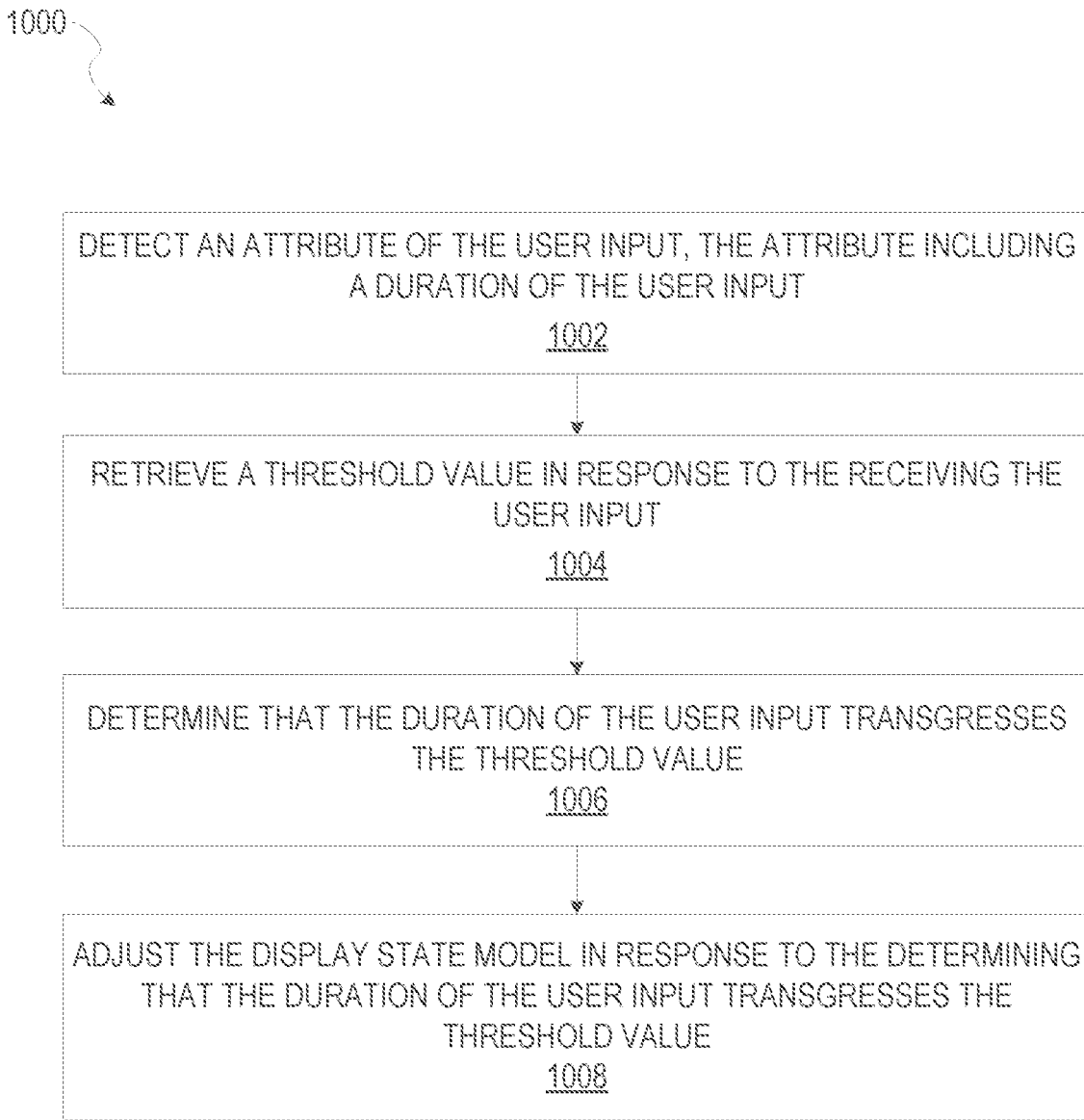
FIG. 10 is a flowchart illustrating a method for adjusting a display state model based on a user input, according to certain example embodiments.

FIG. 10 is a flowchart illustrating a method 1000 for adjusting a display state model based on a user input, according to certain example embodiments. Operations of the method 1000 may be performed by the modules described above with respect to FIG. 6. As shown in FIG. 10, the method 900 includes one or more operations 1002, 1004, 1006, and 1008.

At operation 1002, the user input module 604 determines attributes of a user input received at the client device 102. User input attributes may for example include, a user input type (e.g., based on a selection from among a set of user input types), user input duration, and user input style (e.g., tapping, swiping, petting, touching, etc.).

In response to receiving the user input, the user input module 604 retrieves a threshold value, wherein the threshold value may be based on the user input type. The threshold value may for example include a maximum and/or minimum amount of time for the user input in order for a change in the display state model to occur. For example, the threshold may require that the user input duration is greater than 2 seconds, but less than 10 seconds.

At operation 1006, the user input module 604 determines that the user input duration of the user input transgresses the threshold value associated with the user input type. At operation 1008, the display state module 606 adjust the display state model based on the user input.

FIG. 11 is a depiction of an animated icon 1102, as discussed above. As seen in FIG. 11, the animated icon 1102 may be a virtual pet, such as a cat. The particles 1104 may be displayed by the presentation module 608 in response to the user input module 604 detecting an input at the client device 102, as described in operation 804 of the method 800 depicted in FIG. 8. In some embodiments, attributes and properties of the particles 1104 may be based on attributes of the user input. For example, the color, shape, style, and brightness of the particles 1104 may vary based on user input type, user input duration, user input style, and so on.

Figure 12A:
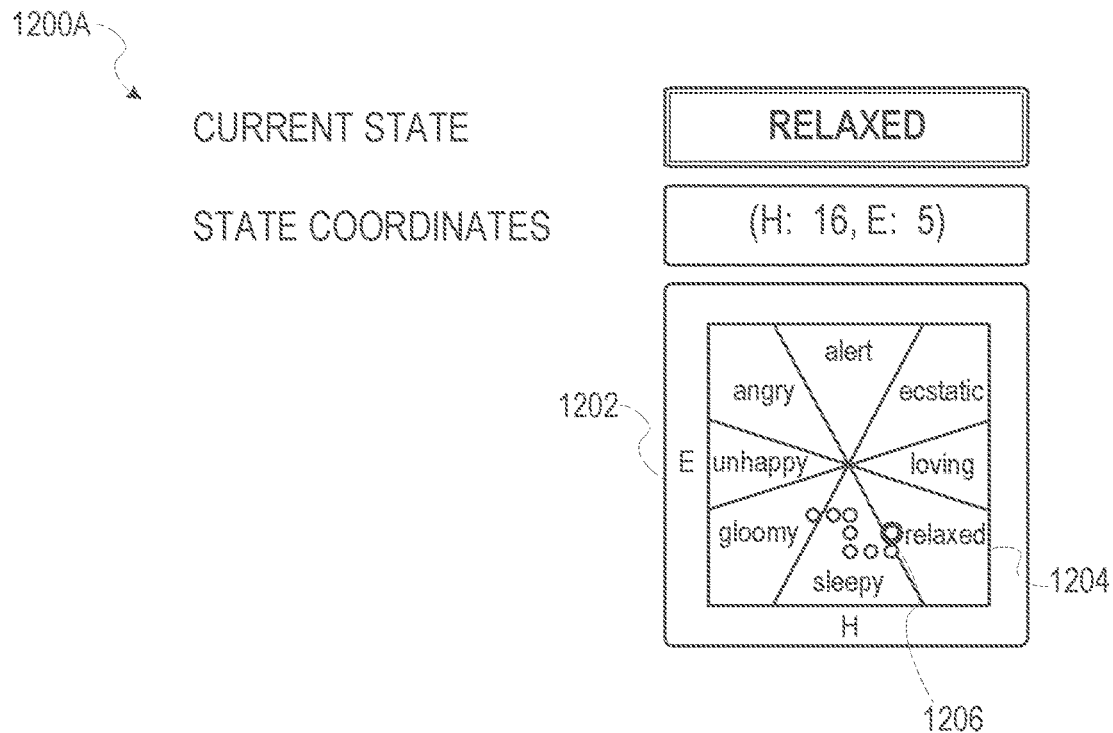
FIG. 12A is a depiction of a display state model, according to certain example embodiments.

FIG. 12A is a depiction 1200A of a display state model 1202. As seen in FIG. 12A, the display state model 1202 may comprise two axes (e.g., labeled E and H in FIG. 12A), may be divided into a set of sub-spaces (e.g., sub-space 1204), and may include a state indicator 1206 (e.g., a point within the two-axis space), wherein the location of the state indicator 1206 within the display state model 1202 defines a state of an associated animated icon.

In some example embodiments, the axes of the display state model may correspond to an "energy" level (e.g., the Y-axis), and a "happiness" level (e.g., the X-axis), of the associated animated icon. As seen in FIG. 12A, the display state model 1202 may be divided into a set of sub-spaces (e.g., sub-space 1204), wherein each sub-space may correspond to a potential state of the animated icon.

As the state indicator traverses the display state model 1202 based on the user inputs (e.g., as discussed with respond to the methods 800, 900, and 1000), the state of the animated icon may change accordingly. For example, the state indicator 1206 is depicted in FIG. 12A as being located within the sub-space 1204, which correspond to a "relaxed" state.

Figure 12B:
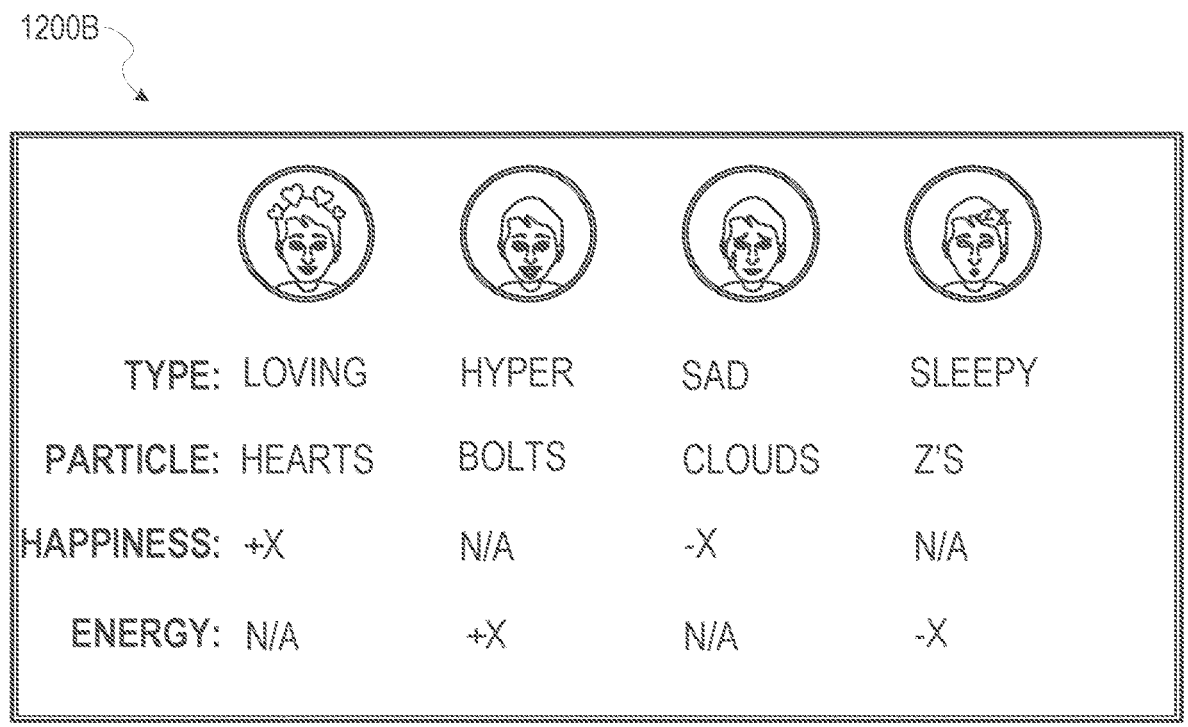
FIG. 12B is a depiction of a set of user input types, according to certain example embodiments.

FIG. 12B is a depiction 1200B of a set of user input types, and associated attributes that correspond to those user input types. As discussed with respect to the method 900 of FIG. 9, a user may select a user input type from among a set of user input types, and the display state module 606 may adjust a point (e.g., state indicator) within an associated display state model (e.g., display state model 1202 of FIG. 12A) based on attributes associated with the user input.

As seen in FIG. 12B, each user input type may have a corresponding particle type to be displayed within the GUI in response to detecting the user input, and as depicted by the particles 1104 of FIG. 11. For example, in response to receiving a selection of the "loving" user input type, the presentation module 608 may cause display of "heart particles," increment the state indicator by a positive value on the axis corresponding to "happiness" (e.g., the Y-axis of display state model 1202 of FIG. 12A), and no change on the axis corresponding to "energy" (e.g., the X-axis of display state model 1202 of FIG. 12A).

Software Architecture

Figure 13:
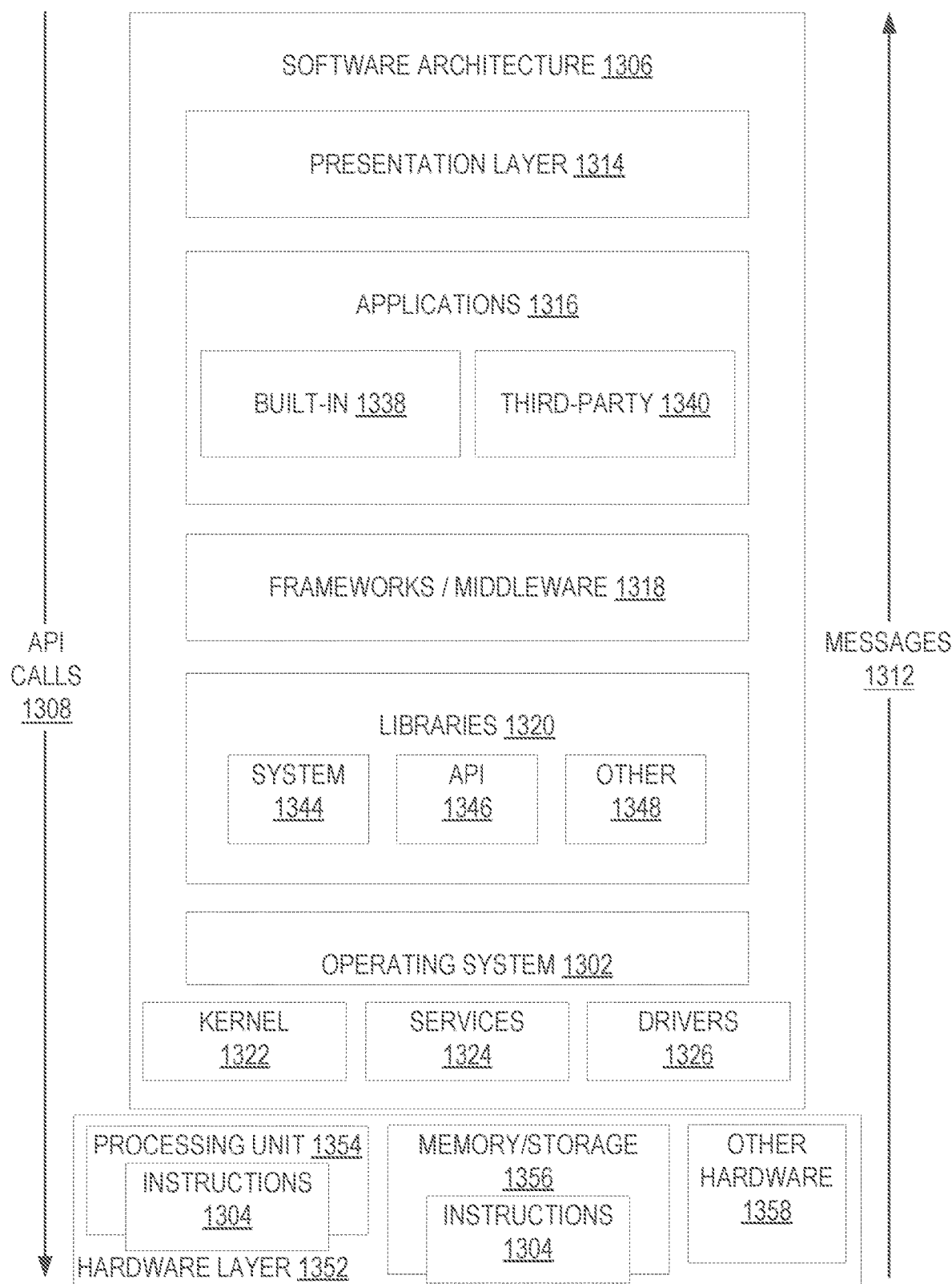
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1404, memory 1414, and I/O components 1418. A representative hardware layer 1352 is illustrated and can represent, for example, the machine 1300 of FIG. 13. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
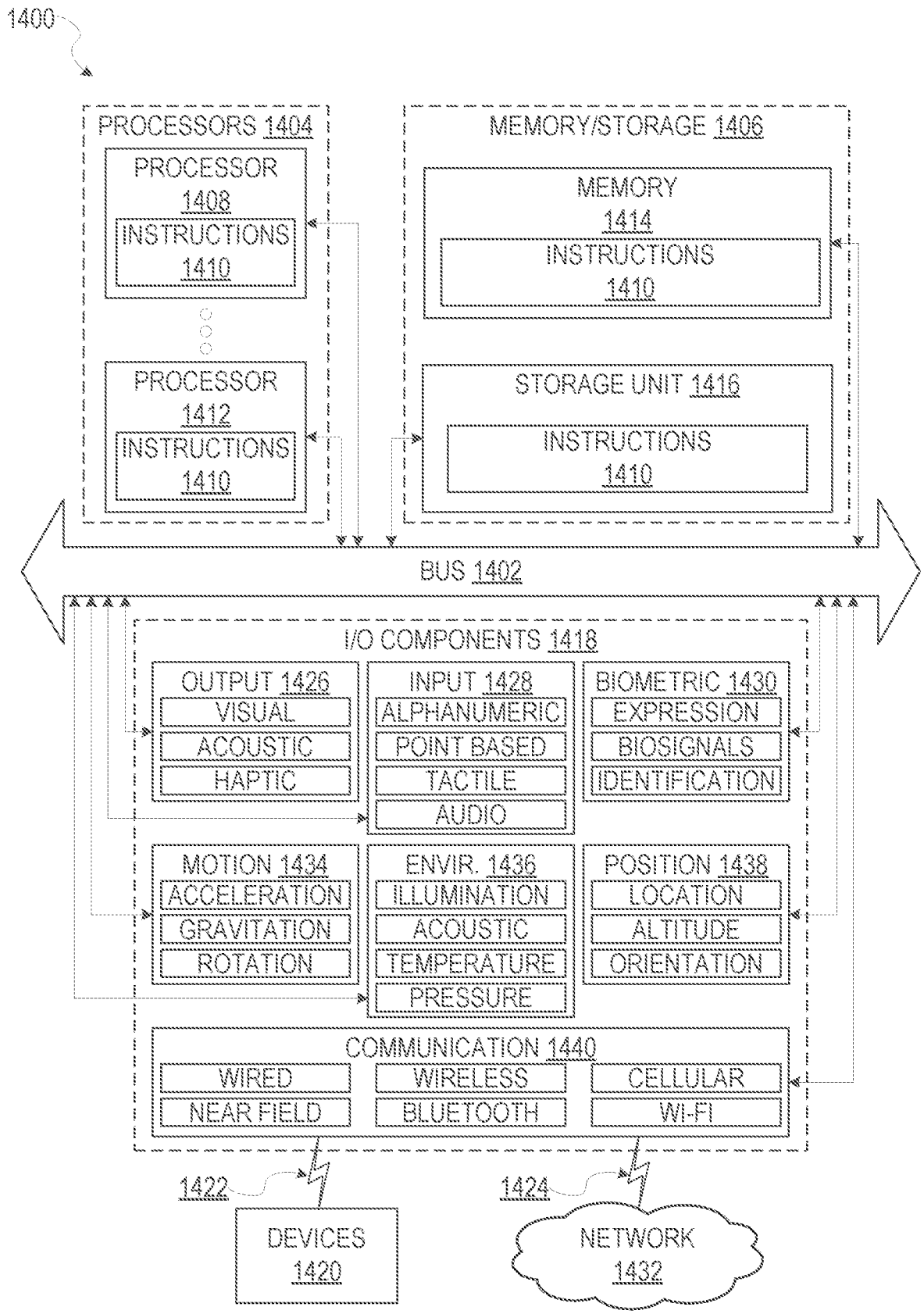
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

What is claimed is:

1. A method comprising:
    detecting, at a first client device, a second client device within a predefined proximity of the first client device;
    accessing user interaction data associated with the first client device and the second client device;
    accessing an animated icon associated with both the first client device and the second client device based on the user interaction data responsive to detecting the second client device within the predefined proximity of the first client device;
    causing display of a presentation of the animated icon at the first client device based on the detecting the second client device within the predefined proximity of the first client device;
    receiving, at the first client device, a user input that comprises input attributes, the input attributes including an input type from among a plurality of input types, each input type among the plurality of input types corresponding with a value;
    determining the value that corresponds with the input type of the user input based on at least the input attributes;
    determining a display state of the animated icon based on the value that corresponds with the input type of the user input; and
    modifying the presentation of the animated icon at the first client device based on the display state.

2. The method of claim 1, wherein the determining the display state of the animated icon includes:
    accessing a display state model associated with the animated icon, the display state model comprising a state indicator at a first position along the display state model, the first position of the state indicator defining a first display state of an animated icon;
    transitioning the state indicator from the first position to a second position based on the value that corresponds with the input type of the user input, the second position corresponding with a second display state; and
    causing display of the presentation of the animated icon based on the second display state.

3. The method of claim 1, wherein the user input includes a tactile input onto a graphical user interface.

4. The method of claim 1, wherein the receiving the user input further comprises:
    causing display of a set of graphical elements that include a first graphical element, the first graphical element corresponding with the user input type; and
    wherein the user input comprises a selection of the first graphical element.

5. The method of claim 1, wherein the animated icon comprises icon properties, and wherein the determining the value of the user input includes determining the value of the user input based on the input attributes and the icon properties of the animated icon.

6. The method of claim 1, wherein the causing display of the presentation of the animated icon further comprises causing display of the presentation of the animated icon within a chat interface.

7. The method of claim 1, wherein the causing display of the presentation of the animated icon includes:
    detecting the first client device within the predefined range of the second client device;
    determining a relationship between the first client device and the second client device; and causing display of the presentation of the animated icon at the first client device based on the relationship.

8. A system comprising:
a memory; and
at least one hardware processor coupled to the memory and comprising instructions that causes the system to perform operations comprising:
detecting, at a first client device, a second client device within a predefined proximity of the first client device;
accessing user interaction data associated with the first client device and the second client device;
accessing an animated icon associated with both the first client device and the second client device based on the user interaction data responsive to detecting the second client device within the predefined proximity of the first client device;
causing display of a presentation of the animated icon at the first client device based on the detecting the second client device within the predefined proximity of the first client device;
receiving, at the first client device, a user input that comprises input attributes, the input attributes including an input type from among a plurality of input types, each input type among the plurality of input types corresponding with a value;
determining the value that corresponds with the input type of the user input based on at least the input attributes;
determining a display state of the animated icon based on the value that corresponds with the input type of the user input; and
modifying the presentation of the animated icon at the first client device based on the display state.

9. The system of claim 8, wherein the determining the display state of the animated icon includes:
accessing a display state model associated with the animated icon, the display state model comprising a state indicator at a first position along the display state model, the first position of the state indicator defining a first display state of an animated icon;
transitioning the state indicator from the first position to a second position based on the value of the user input, the second position corresponding with a second display state; and
causing display of the presentation of the animated icon based on the second display state.

10. The system of claim 8, wherein the user input includes a tactile input onto a graphical user interface.

11. The system of claim 8, wherein the receiving the user input further comprises:
causing display of a set of graphical elements that include a first graphical element, the first graphical element corresponding with the user input type; and
wherein the user input comprises a selection of the first graphical element.

12. The system of claim 8, wherein the animated icon comprises icon properties, and wherein the determining the value of the user input includes determining the value of the user input based on the input attributes and the icon properties of the animated icon.

13. The system of claim 8, wherein the causing display of the presentation of the animated icon further comprises causing display of the presentation of the animated icon within a chat interface.

14. The system of claim 8, wherein the causing display of the presentation of the animated icon includes:
detecting the first client device within the predefined range of the second client device;
determining a relationship between the first client device and the second client device; and
causing display of the presentation of the animated icon at the first client device based on the relationship.

15. A non-transitory machine-readable storage medium comprising instructions that, when executed by one or more processors of a machine, cause the machine to perform operations comprising:
detecting, at a first client device, a second client device within a predefined proximity of the first client device;
accessing user interaction data associated with the first client device and the second client device;
accessing an animated icon associated with both the first client device and the second client device based on the user interaction data responsive to detecting the second client device within the predefined proximity of the first client device;
causing display of a presentation of the animated icon at the first client device based on the detecting the second client device within the predefined proximity of the first client device;
receiving, at the first client device, a user input that comprises input attributes, the input attributes including an input type from among a plurality of input types, each input type among the plurality of input types corresponding with a value;
determining the value that corresponds with the input type of the user input based on at least the input attributes;
determining a display state of the animated icon based on the value that corresponds with the input type of the user input; and
modifying the presentation of the animated icon at the first client device based on the display state.

16. The non-transitory machine-readable storage medium of claim 15, wherein the determining the display state of the animated icon includes:
accessing a display state model associated with the animated icon, the display state model comprising a state indicator at a first position along the display state model, the first position of the state indicator defining a first display state of an animated icon;
transitioning the state indicator from the first position to a second position based on the value of the user input, the second position corresponding with a second display state; and
causing display of the presentation of the animated icon based on the second display state.

17. The non-transitory machine-readable storage medium of claim 15, wherein the user input includes a tactile input onto a graphical user interface.

18. The non-transitory machine-readable storage medium of claim 15, wherein the receiving the user input further comprises:
causing display of a set of graphical elements that include a first graphical element, the first graphical element corresponding with the user input type; and
wherein the user input comprises a selection of the first graphical element.

19. The non-transitory machine-readable storage medium of claim 15, wherein the animated icon comprises icon properties, and wherein the determining the value of the user input includes determining the value of the user input based on the input attributes and the icon properties of the animated icon.

20. The non-transitory machine-readable storage medium of claim 15, wherein the causing display of the presentation of the animated icon further comprises causing display of the presentation of the animated icon within a chat interface.

\* \* \* \* \*